United States Patent Office 3,701,642
Patented Oct. 31, 1972

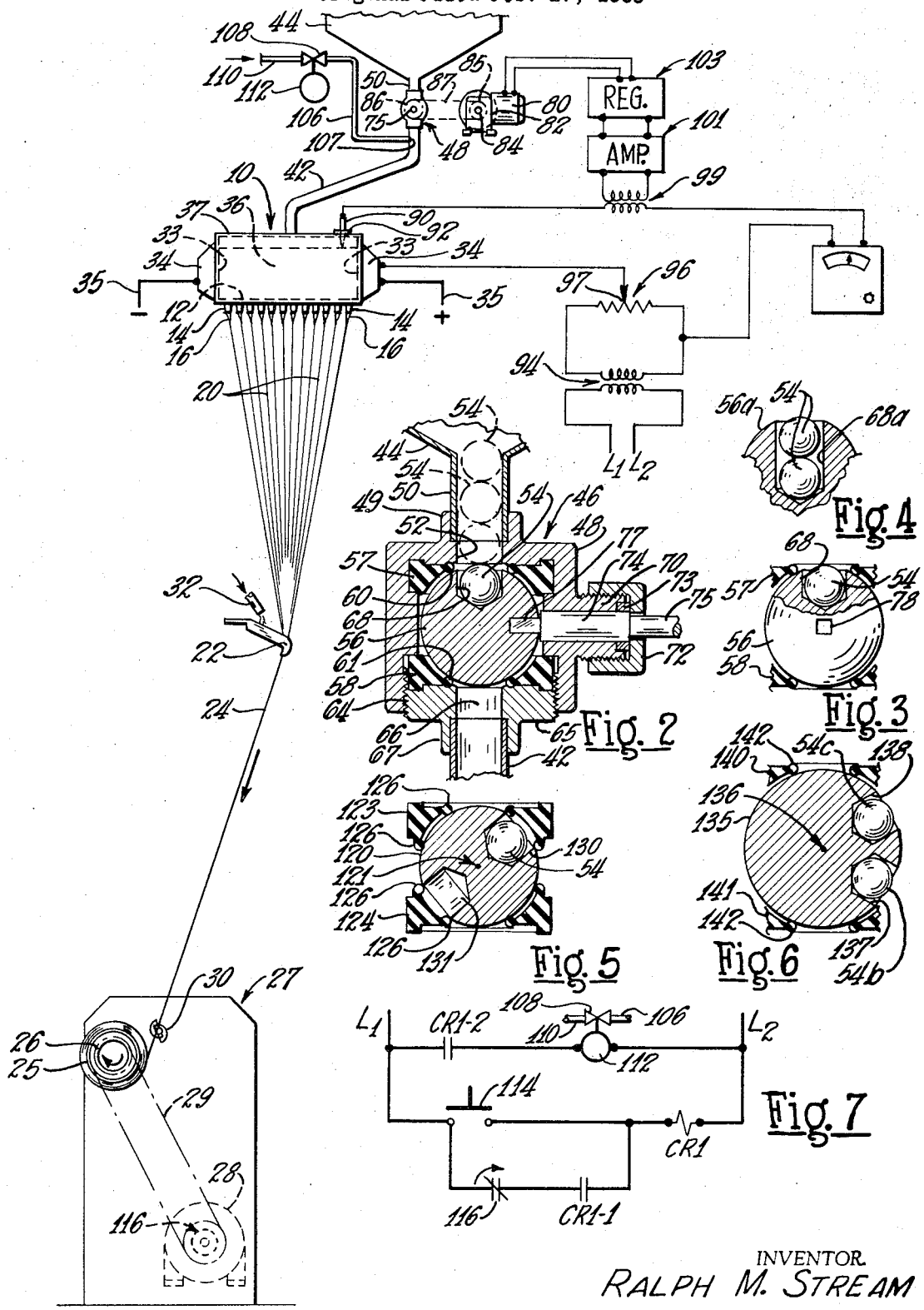

3,701,642
APPARATUS FOR MAKING CONTINUOUS
GLASS FIBERS
Ralph M. Stream, Newark, Ohio, assignor to Owens-Corning Fiberglas Corporation
Continuation of abandoned application Ser. No. 799,848, Feb. 17, 1969. This application May 21, 1971, Ser. No. 145,963
Int. Cl. C03b 37/02
U.S. Cl. 65—11 W
8 Claims

ABSTRACT OF THE DISCLOSURE

This invention pertains to a pressurized glass fiber stream feeder having a rotary supply means for supplying glass marbles to a melting compartment of the feeder. The rotary supply means has yieldable members within the housing to prevent escape of pressurized air from the feeder.

---

This application is a continuation of Ser. No. 799,848, filed Feb. 17, 1969, now abandoned.

In the production of fine glass filaments particularly for textile uses it has been conventional practice to flow streams of glass through orifices in a stream feeder and attenuate the streams to filaments, and a substantially constant head of glass being maintained in the stream feeder by suitable glass level control means. In feeders heretofore used, the heat-softened glass in the feeder is under atmospheric or near atmospheric pressure.

In usual production operations, initiation or start up of attenuating operations, after filament "break-outs" interrupt attenuation, is effected by awaiting the comparatively slow formation of droplets or beads of glass at the stream delivery orifices of the feeder until the droplets or beads attain sufficient weight to drop by gravity with attendant trailing filaments, the trailing filaments being converged into a strand and winding of the strand manually initiated by the operator on a collector and the collector rotated to attenuate the streams to continuous filaments. The feeder constructions employed for feeding the streams of glass are usually of comparatively small size, the feeder containing a relatively small amount of glass providing a low pressure head of glass. Heretofore the head of glass provided stream flow through the orifices, the pressure head of glass being maintained substantially constant during attenuation as well as during start up viz. "bead formation and drop time" periods. Due to the comparatively small head of glass in the stream feeder, considerable time lapses before the beads become of sufficient weight to fall by gravity and attenuating operations resumed.

The invention embraces a method of establishing pressure on the glass in a stream feeder in order to promote delivery of glass through feeder orifices at an increased rate and thereby accelerate bead formation and bead drop time to substantially reduce start up time following filament break-outs.

Another object of the invention resides in a method of pressurizing a feeder for delivering streams of heat-softened glass wherein the pressure may be regulated or controlled to vary the stream flow rate from the feeder orifices.

Another object of the invention resides in a method of pressurizing a receptacle containing glass provided with orifices through which streams of glass may be delivered and wherein additional pressure may be applied for start-up of attenuation or continued during filament attenuating operations.

Another object of the invention resides in the provision of a receptacle or stream feeder in which glass is melted and streams of glass delivered therefrom associated with valve means for controlling fluid pressure upon the glass in the feeder.

Another object of the invention resides in an arrangement for pressurizing a glass stream feeder, the arrangement embodying a pressure sealed movable means for automatically delivering marbles or pieces of prerefined glass to the feeder at a rate determined by the stream flow rate from the stream feeder.

Another object of the invention is the provision of a glass melter and stream feeder associated with means for metering the delivery of pieces of glass into the melter and feeder to maintain substantially constant the head of glass in the feeder, the arrangement including means for impressing fluid pressure on the glass in the stream feeder following a filament break-out in order to accelerate the formation of beads of glass at the orifices to reduce the bead drop time and thereby reduce the time required for reinitiating filament attenuating operations after filament break-outs.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 1 is a front elevational view of a glass melting and stream feeder unit and marble feed system and pressurizing arrangement for the feeder in association with a winding machine for attenuating and collecting filaments formed from the glass streams;

FIG. 2 is an enlarged sectional view of a form of marble feeding or metering means embodying a pressure sealing means;

FIG. 3 is an elevational view, partly in section, illustrating a rotatable member for transferring marbles individually from a supply to the feeder;

FIG. 4 illustrates a modified form of marble feed rotor construction;

FIG. 5 is a modified form of marble feeding means for transferring two marbles to the stream feeder during each revolution of the marble feeding member;

FIG. 6 illustrates a modified form of a marble feeding means for transferring two marbles to a stream feeder during each revolution of a marble feeding member, and FIG. 7 is a schematic circuit of the means for controlling fluid pressure in the stream feeder.

Referring to the drawings in detail and initially to FIG. 1, there is illustrated a combined melter and stream feeder or bushing 10 adapted to contain heat-softened glass and into which pieces or marbles of prerefined glass are delivered in a manner hereinafter described. The stream feeder 10 is fashioned with a floor 12 provided with a large number of depending projections 14, each having a passage or orifice through which a stream 16 of glass is delivered from the feeder.

The streams are attenuated to fine continuous filaments 20 which are converged by a gathering means or shoe 22 into a strand 24 and the strand wound upon a collector tube 25 mounted upon a rotatable collet 26 of a winding machine 27. The winding collet 26 is rotated in a conventional manner by an electrically-energizable motor 28 through a driving belt 29 within the winding machine housing. The strand 24 is guided onto the collector tube 25 by a reciprocable and rotatable traverse member or oscillator 30 to effect a crossing of the individual wraps or convolutions of strand as the strand is wound on the collector 25 and the strand distributed lengthwise on the collector 25 by reciprocable movement of the traverse oscillator 30.

The traverse oscillator may be of the character shown in the Beach Pat. 2,391,870. A lubricant, size or binder may be applied to the filaments from a nozzle 32 which delivers the lubricant, size or binder to the gathering shoe for application to the filaments by wiping action.

The stream feeder 10 in the embodiment illustrated is of substantially rectangular configuration. Welded or otherwise secured to the end walls 33 of the feeder are terminals or lugs 34 for connection through conductors 35 with a source of electric energy of comparatively high amperage and low voltage for heating the feeder to melt the marbles or pieces of glass delivered into the feeder and maintain the glass in the feeder of proper viscosity whereby the streams 16 of glass delivered from the feeder may be attenuated to filaments.

The end walls 33 are joined with spaced side walls of the feeder, one of which is shown in FIG. 1, and with the feeder floor 12 providing a rectangular glass-containing chamber 36. The feeder is provided with a top plate 37 joined with the side and end walls of the feeder to provide the confined chamber 36 which is pressurized as hereinafter described for start up purposes. The feeder 10 and the top or cover plate 37 are preferably fashioned of an alloy of platinum and rhodium to withstand the high temperature of the molten glass. The feeder is preferably surrounded by refractory (not shown) to minimize heat losses.

Means is provided for feeding or delivering pieces or marbles or prerefined glass into the confined or closed chamber 36 at a controlled rate. Connected with the plate 37 of the feeder in sealing engagement therewith is a tube or chute 42.

The tube 42 is of an interior diameter to slidably receive marbles or pieces of glass from a supply disposed in a hopper or container 44 through a pressure-barrier type, rotary marble feeder 46 whereby the marbles may be fed through the tube 42 into the chamber 36 without loss of pressure when additional pressure is impressed on the molten glass in the chamber 36.

The rotary marble feeder 46 is illustrated in FIG. 2 and is inclusive of a housing 48 preferably of cast metal provided with a boss portion 49 bored to receive the end of a chute or tube 50 connected with the lower end of the hopper 44. A passage or bore 52 in the boss 49 is of a diameter to accommodate passage of the marbles or bodies 54 of glass from the hopper 44. The housing 48 is of hollow configuration in which is disposed a marble feed rotor or member 56 preferably of spherical shape for rotation within the housing.

Embracing the upper and lower regions of the marble feed rotor 56 are annular sealing members 57 and 58 of yieldable material such as rubber or resinous plastic material. The annular members 57 and 58 are fashioned with annular ridges 60 and 61 for snug sealing engagement with the spherical periphery of the rotor 56, as shown in FIG. 2. The annular ridges 60 and 61 seal off the interior of the stream feeder from the atmosphere. The housing has a threaded opening 64 accommodating a threaded fitting or member 65, the member 65 engaging the yieldable annular member 58 for securing the latter in position in the housing.

The member 65 has a boss portion 67 bored to receive the upper end of the tube 42 in registration with a passage 66 in the fitting. The end region of the tube 42 is pressed into a bore in the boss portion 67 or otherwise secured to the fitting 65 to provide a gas tight seal to enhance pressurizing the tube 42 and the feeder chamber 36.

The rotor 56 is fashioned with a radial bore or recess 68 of a dimension to loosely receive a glass marble 54 as illustrated in FIG. 2. The rotor 56, in the position shown in FIG. 2 receives a marble 54 from the hopper 44 through the tube 50. When the rotor 56 is rotated through 180°, the marble 54 in the recess 68 is in registration with the passage 66 and tube 42 and moves by gravity through the tube 42 into the chamber 36 of the stream feeder 10.

Means is provided for rotating the rotor 56 at a controlled rate in order to feed marbles of glass into the chamber 36 at substantially the rate at which the molten glass flows from the chamber 36 through the orificed projections 14. The housing 48 has a projection 70 threaded to receive a cap 72. The projection 70 is bored to provide a journal bearing for a portion 74 of a drive shaft 75. The portion 74 is fashioned with a polygonally-shaped tenon or portion 77 which fits into a reciprocally-shaped recess 78 provided in the rotor 56 whereby rotation of the shaft 75 effects rotation of the rotor 56 about the axis of the shaft 75. Sealing material 73, contained within the cap 72, engages the portion 74 of the drive shaft to provide a pressure tight seal.

The drive for the shaft 75 includes an electrically energizable motor 80 associated with a conventional speed reducing mechanism contained in a housing 82, shown in FIG. 1. The motor 80 drives an input shaft of the speed reducing mechanism in the housing 82, the output shaft 84 of the speed reducing mechanism being rotated at a comparatively low speed. The output shaft 84 of the speed reducer 82 is equipped with a sprocket 85 which drives a sprocket 86 fixed on the shaft 75 through a drive belt 87. Through this arrangement the marble feed rotor 56 is rotated at a comparatively slow speed.

Means is provided for controlling the operation of the motor 80 from a glass level control probe 90 extending into the chamber 36 containing molten glass. The arrangement for controlling the operation of the motor 80 is of the character disclosed in U.S. patent of William C. Trethewey, No. 3,246,124. The probe 90 is insulated from the feeder by refractory member 92 or other heat-resistant insulating material providing a seal with the top plate 37. The level of the molten glass in chamber 36 is detected or sensed by the probe 90 having a tapered tip in contact with the surface of the glass. A difference in potential is established between the probe 90 and the molten glass through electrical connections to a transformer 94 through a voltage divider 96.

The transformer 94 is connected with electrical energy supply lines L1 and L2, the transformer providing relative low voltage in its secondary for supply to the voltage divider 96. A variable tap 97 of the voltage divider provides for the selection of the voltage to be applied across the feeder and glass and the probe 90.

A coupling transformer 99 in series with the probe 90 transmits a current signal from the circuit loop incorporating the probe 90 to an amplifier 101 which in turn supplies the amplified current signal to a regulator 103. The regulator is connected to the field winding of the marble feeding drive motor 80.

When the level of the molten glass in the feeder falls below a predetermined height determined by the probe position, the current flow in the probe loop circuit is reduced by reason of the reduced area of interfacial contact of the glass with the tip of the probe. The probe current is reduced and hence the amplifier signal supplied to the regulator 103 is reduced causing a corresponding increase in the voltage supplied to the field winding of the motor 80 through the regulator 103.

The increase voltage effects an increase in the speed of the motor 80 and the marble feeding rotor 56 at the slightly faster rate than the rate of the throughput of the glass of the streams 16 flowing from the feeder. Should the level of the molten glass in the chamber 36 of the feeder increase above the predetermined height or level, the regulator 103 reduces the voltage applied to the field winding of motor 80 as determined by the amplified probe current signal supplied to the regulator to thereby reduce the rate of rotation of the motor 80 and correspondingly the rate of feed of the glass marbles delivered into the feeder chamber 36.

Through this arrangement the height of the body of molten glass in the feeder chamber 36 varies through minimum deviations so that the pressure head, provided by the depth of the glass in the feeder chamber remains, substantially constant during normal flow of streams 16 through the feeder which are attenuated to filaments and a strand of the filaments wound into a package on the collector or forming tube 25 on the winding mandrel 26.

The regulator 103 may be arranged to provide an on-off signal to the motor 80 to feed marbles to the feeder chamber 36 when the level of the molten glass drops below a predetermined height and to cut off the feeding of marbles when the height is exceeded. It is preferable, however, that a fully modulated arrangement be provided as hereinbefore described wherein the rate of feed of the marbles is substantially constantly adjusted to maintain a uniform head of glass in the stream feeder.

The arrangement hereinbefore described is a normal operation after the winding of the strand 24 of the glass filaments is initiated on the rotating collector 25. In event of filament "break-outs" or interruptions of the attenuating operation, the softened glass at the tips of the orificed projections tends to slowly form beads of glass which eventually attain a size and weight whereby the beads fall by gravity from the projections 14 with filaments trailing the beads. Normally, considerable time lapses after interrupted filament attenuation until the beads of glass form and drop from the projections.

The arrangement of the invention is inclusive of means for impressing increased pressure on the body of molten glass in the feeder chamber 36 to accelerate flow of streams of glass through the orificed projections 14 thereby effecting the formation of beads of glass in a much shorter time and substantially reducing the time in which filament attenuation may be restarted. With reference to FIG. 1, a pipe or conduit 106 is connected as at 107 with the tube 42 at a region between the rotary marble feeding means 46 and the feeder chamber 36.

Compressed air or other gas under pressure is supplied under control of a valve means through the tube 106 into the feeder chamber 36 above the molten glass in the feeder chamber to increase the pressure on the glass after impairment of normal stream flow and preparatory to a start up or restart of the attenuating operation and thereby accelerate the flow of glass through the orificed projections 14 so as to form beads of glass at the projections and the beads to drop in a minimum of time.

Means is provided for initiating and maintaining the increased pressure on the glass molten at least until the beads of glass form and drop and winding of a strand of the filaments on the collector 25 is initiated. A valve 108 is connected with the tube 106 and with a pipe or tube 110, the latter being connected with a supply of compressed air or other gas under pressure. The valve 108 is preferably of the type actuated by a solenoid 112. The valve 108 is normally in closed position during normal filament attenuating operations so that no increase in pressure during such operations is impressed on the molten glass in the feeder chamber 36.

FIG. 7 illustrates a circuit arrangement wherein the operator closes a manually controlled switch actuating the solenoid valve 108 to open position to impress additional pressure on the molten glass in the chamber 36, the valve 108 being automatically closed by a biasing spring when the solenoid circuit is opened. Current for actuation of the solenoid 112 is provided through supply lines L1 and L2 shown in FIG. 7. A manually operated switch is illustrated at 114. A centrifugal switch 116 actuated by the winding machine motor 28 is intercalated in the solenoid circuit for deenergizing the solenoid. The circuit includes current relay CR1 having contacts CR1–1 and CR1–2.

When filament "break-outs" or interruption of the filament attenuating operation occurs, the operator manually closes the switch 114 which closes the relay contacts CR1–1 and CR1–2 to energize the solenoid 112, opening the valve 108 and admitting compressed air from the supply through tubes 110 and 106 into the tube 42 into the upper region of the feeder chamber 36, thus impressing pressure on the body of molten glass in the feeder chamber.

A pressure increase of from between three and fifteen pounds per square inch has been found effective to accelerate the stream flow or throughput of glass through the orificed projections 14 and thereby substantially reduce the time within which the beads are formed and drop by gravity so that the "downtime" is substantially reduced in restarting attenuation.

When the beads drop from the projections the operator initially winds the filaments trailing the beads onto the collector tube 25 of the winding machine and through conventional switch means (not shown) energizes the motor 28 to effect winding of the strand 24 of filaments on the package.

When the motor 28 attains a predetermined speed the normally closed centrifugal clutch 116 is opened, causing contacts CR1–1 and CR1–2 to open, to deenergize the solenoid actuator of valve 108 and the valve closed by a spring (not shown) embodied in the conventional solenoid-actuated valve construction. The closing of the valve 108 relieves fluid pressure on the molten glass in the feeder chamber 36. During normal attenuating operations the pressure effecting stream flow through the orificed projections 14 is the pressure head of glass in the feeder chamber 36.

The circuit arrangement illustrated in FIG. 6 is semi-automatic in its operation in that the operator closes the switch 114 to open the solenoid actuated valve 108 to impress pressure on the glass in the feeder chamber, and the switch 116 automatically relieves the pressure of the compressed air on the glass by opening the valve 108 when the winding machine motor 28 attains a speed effective to actuate the centrifugal switch 116.

If desired, the impression of pressure may be manually controlled without the use of the centrifugal switch 116 and the current relay as the operator may manually hold the switch 114 in solenoid-actuating position until the beads of glass fall by gravity so that attenuation may be restarted.

Pressure is maintained in the tube 42 and above the glass in the chamber 36 through the sealing means 60 and 61 provided on the annular members 57 and 58 which are in constant sealing engagement with the surface of the marble feed rotor 56 so that there is no loss of pressure through the rotatable marble feeding device 46.

FIG. 4 illustrates a modification of the marble feed rotor where it is desired to deliver two marbles or bodies of glass 54 at each rotation of the rotor. As shown in FIG. 4, the recess 68a in the rotor 56a is of increased depth to accommodate two glass marbles 54. When the rotor is moved through 180° from the position shown in FIG. 2, the two marbles in the recess 68a fall by gravity through the passage 66 and through the tube 42 into the chamber 36.

FIG. 5 is illustrative of a modified form of feed rotor construction for delivering one glass marble or body through each 180° of rotation of the feed rotor. The rotor 120 of spherical shape is rotatable about an axis 121, the rotor being disposed in a housing similar to the housing 48. Annular members 123 and 124 of yieldable material are fashioned with annular ridges 126 in sealing engagement with the surface of the rotor 120. The rotor 120 is fashioned with diametrically opposed bores or recesses 130 and 131, each of a depth to accommodate a glass marble 54, one being shown in the recess 130.

During rotation of the rotor 120, which is driven by an arrangement such as shown in FIG. 1, a marble or body from the hopper enters a recess when the same is in registration with the hopper delivery tube 50. When the rotor is rotated through 180°, the recess 130 containing a glass marble registers with the tube 42 and the marble falls by gravity into the tube and is conveyed into the feeder chamber. In this position of the feed rotor 120 a marble from the hopper tube 50 enters the recess 131 as the axis of the recesses 130 and 131 is in vertical alignment with the hopper tube 50 and the marble delivery tube 42. Through this construction a marble or body of prerefined glass is delivered into the feeder chamber during each half revolution of the feeder 120.

FIG. 6 illustrates another modification of marble feed rotor. In this form the feed rotor 135, which is rotatable about an axis 136, is fashioned with bores or recesses 137 and 138, each adapted to accommodate a marble of glass. The recesses 137 and 138 are in juxtaposed relation at one side of the axis 136 of rotation of the rotor. The arrangement is enclosed in a housing similar to the housing 48 shown in FIG. 2 and annular members 140 and 141 provided with circular ridges 142 in sealing engagement with the spherical surface of the rotor 135.

The rotor 135 is driven and controlled by the arrangement shown in FIG. 1. Assuming that the rotor 135 is rotating in a clockwise direction, when the recess 137 is in its uppermost position in registration with the hopper tube 50, a glass marble 54b falls by gravity from the hopper into the recess 137.

When the rotating rotor attains a position where the recess 138 registers with the hopper tube 50, a marble of glass 54c falls into the recess 138 so that both recesses contain marbles when the rotor is in the position shown in FIG. 6.

When the recesses 137 and 138 are successively moved into registration with the marble conveying tube 42 the marbles 54b and 54c fall in close succession into the tube 42 and are conveyed into the feeder chamber. Thus, with each revolution of the feeder 135 two marbles or pieces of glass are delivered into the feeder chamber in close succession with an increased period of time occurring between delivery of successive pairs of marbles.

Through the above described method of and arrangement for feeding one or two bodies or marbles of glass during each revolution of the feeding device, the periodic admission of this amount of solid glass into the molten glass in the feeder does not appreciably impair or disturb thermal stabilization in the stream feeder.

It is apparent that, within the scope of the invention, modifications and different arrangements may be made other than as herein disclosed, and the present disclosure is illustrative merely, the invention comprehending all variations thereof.

I claim:

1. Apparatus for processing glass including, in combination, a stream feeder, said stream feeder having a plurality of orifices for flowing streams of glass from the stream feeder, means providing a supply of bodies of glass, a housing, a rotatable body feeding means in said housing arranged to receive bodies of glass from the supply, means for heating the stream feeder for melting the bodies of glass, tubular means connecting the body feeding means with the stream feeder, means for continuously rotating the body feeding means for transferring bodies of glass through the tubular means into the stream feeder, pressure sealing means in said housing in sealing engagement with said body feeding means, means regulating the rate of rotation of the body feeding means to maintain substantially constant the amount of molten glass in the stream feeder, means for conveying fluid under pressure into the stream feeder for impressing pressure on the molten glass in the stream feeder, valve means for controlling flow of fluid under pressure to said stream feeder, and means for actuating the valve means to a position impressing fluid pressure in the stream feeder.

2. Apparatus for processing glass including, in combination, a stream feeder, the feeder having a floor provided with orifices for flowing streams of glass from the feeder, means providing a supply of bodies of glass, a housing, a rotatable body feeding means in said housing arranged to receive bodies of glass from the supply, tubular means connecting the housing with the stream feeder, means for electrically heating the feeder for melting the bodies of glass, sealing means in said housing in sealing engagement with the rotatable body feeding means, means for continuously rotating the body feeding means for transferring bodies through the tubular means into the stream feeder, means regulating the rate of rotation of the body feeding means to maintain substantially constant the amount of molten glass in the stream feeder, means for conveying fluid under pressure into the stream feeder for impressing pressure on the molten glass in the stream feeder, and valve means for controlling flow of fluid under pressure to said stream feeder, said valve means being movable to a position relieving fluid pressure on the glass in the stream feeder.

3. Apparatus for processing glass including, in combination, a stream feeder, the feeder having a floor provided with orifices for flowing streams of glass from the feeder, means for attenuating the streams to filaments, means for electrically heating the feeder for melting bodies of glass in the feeder, means providing a supply of bodies of glass, means for feeding bodies of glass from the supply to the stream feeder including a housing, a body feeding member in said housing, means for rotating said member, said member having a body-receiving recess, passage means in said housing to facilitate movement of bodies from the supply to said recess, means in said housing in sealing engagement with said member, tubular means in communication with said housing and said stream feeder through which bodies are transferred to the stream feeder, sensor means for sensing the level of molten glass in the stream feeder, means actuated by the sensor for controlling the rate of rotation of the means for rotating the body feeding member whereby to maintain substantially constant the level of glass in the stream feeder, means for conveying fluid under pressure into the stream feeder above the molten glass therein, and valve means for controlling flow of fluid under pressure to said stream feeder, said valve means being movable to a position relieving fluid pressure on the glass in the stream feeder.

4. The combination according to claim 3 wherein the valve means is a solenoid operated valve, and a switch in circuit with the solenoid of the valve means.

5. The combination according to claim 4 including relay means in circuit with said solenoid and said switch for holding the solenoid actuated valve in open position, the filament attenuating means being a winding machine for winding a strand of the attenuated filaments on a rotating collector, a motor for rotating the collector, and means in said solenoid and switch circuit rendered effective by said motor when the latter is in operation for actuating the relay means to deenergize the solenoid whereby the valve means is closed to relieve pressure on the glass in the stream feeder.

6. The combination according to claim 5 wherein the means in said circuit activated by rotation of the motor of the winding machine is a centrifugal switch.

7. Apparatus for processing glass including, in combination, a stream feeder, the feeder having a floor provided with orifices for flowing streams of glass from the feeder, means for attenuating the streams to filaments, means for electrically heating the feeder for melting marbles of glass, means providing a supply of marbles of glass, means for feeding marbles of glass from the supply to the stream feeder including a housing, a marble feeding member in said housing, said member having recess means to accommodate marbles of glass, passage means in said housing to facilitate movement of marbles from the supply to said recess means, yieldable means in said housing in sealing engagement with said member, motive means for rotating said member, tubular means in communication with said housing and said stream feeder through which the marbles from the recess means are transferred to the tubular means and thereby delivered into the stream feeder, a sensor for sensing the level of glass in the stream feeder, means actuated by the sensor for controlling the rate of rotation of the motive means for rotating the marble feeding member whereby to maintain substantially constant level of glass in the stream feeder, means for conveying fluid under pressure into the stream feeder above the molten glass therein, and valve means for controlling flow of pressure fluid to the stream feeder to impress pressure on the glass in the feeder upon interruption of attenuation to accelerate flow of glass through the orifices to reduce bead formation and bead drop time and shorten the period required for resumption of attenuation.

8. The combination according to claim 7 wherein the valve means is a solenoid actuated valve, manually operable switch means effective to energize said solenoid actuated valve to open the valve, and means automatically operable upon resumption of attenuation to deenergize the solenoid of the valve means to effect a closing of the valve and relieve the fluid pressure on the glass.

References Cited

UNITED STATES PATENTS 2,974,359   3/1961   Van Der Hoven _____ 65—1 X
2,294,266   8/1942   Barnard _____ 65—4 X ROBERT L. LINDSAY, Jr., Primary Examiner U.S. Cl. X.R.

65—2